United States Patent [19]

Kudchadker et al.

[11] 3,978,927
[45] Sept. 7, 1976

[54] ALKOXYLATED ASPHALTS AS SACRIFICIAL AGENTS IN OIL RECOVERY PROCESSES

[75] Inventors: Mohan V. Kudchadker; Thad O. Walker, both of Houston, Tex.

[73] Assignee: Texaco Inc., Houston, Tex.

[22] Filed: Sept. 10, 1975

[21] Appl. No.: 612,118

[52] U.S. Cl. .............................. 166/273; 252/8.55 D
[51] Int. Cl.$^2$ .......................................... E21B 43/16
[58] Field of Search ........... 166/273, 274, 275, 294; 252/8.55 D

[56] References Cited
UNITED STATES PATENTS

| | | | |
|---|---|---|---|
| 3,087,539 | 4/1963 | Maurer | 166/274 |
| 3,414,053 | 12/1968 | Treiber et al. | 166/273 |
| 3,437,141 | 4/1969 | Brandner et al. | 166/273 |
| 3,469,630 | 9/1969 | Hurd et al. | 166/273 |
| 3,478,823 | 11/1969 | Murphy | 166/274 |
| 3,498,379 | 3/1970 | Murphy | 166/273 |
| 3,777,817 | 12/1973 | Feuerbacher et al. | 166/273 |
| 3,788,399 | 1/1974 | Feuerbacher et al. | 166/274 |
| 3,797,574 | 3/1974 | Feuerbacher et al. | 166/274 |
| 3,910,350 | 10/1975 | Mastroianni | 166/274 |

FOREIGN PATENTS OR APPLICATIONS

| | | | |
|---|---|---|---|
| 168,398 | 4/1965 | U.S.S.R. | 208/44 |

*Primary Examiner*—Ernest R. Purser
*Assistant Examiner*—Jack E. Ebel
*Attorney, Agent, or Firm*—Carl G. Ries; Thomas H. Whaley; Kenneth R. Priem

[57] ABSTRACT

A process for producing petroleum from subterranean formations is disclosed wherein production from the formation is obtained by driving a fluid from an injection well to a production well. The process involves injecting into the formation via the injection well an aqueous solution of ethoxylated asphalts as a sacrificial agent to inhibit the deposition of surfactant and/or polymer on the reservoir matrix. Normally the process would be carried out by first injecting the ethoxylated asphalts into the formation through the injection well and following them with either a polymer or a surfactant solution. The polymer and/or surfactant would then be followed by a drive fluid such as water to push the chemicals to the production well.

9 Claims, No Drawings

ALKOXYLATED ASPHALTS AS SACRIFICIAL AGENTS IN OIL RECOVERY PROCESSES

BACKGROUND OF THE INVENTION

1. Field of the Invention

This invention relates to the recovery of oil from subterranean formations by chemical flooding methods.

2. Description of the Prior Art

Petroleum is frequently recovered from subterranean formations or reservoirs by permitting the natural energy of the reservoir to push the petroleum up through wells to the surface of the earth. These processes are referred to as primary recovery methods since they use the natural energy of the reservoir. However, a large amount of oil, generally in the range of 65–90% or more, is left in the subterranean formation at the conclusion of the primary recovery program. When the natural reservoir energy is unable to produce more petroleum, it is a common practice to resort to some form of supplemental recovery technique in order to recover additional petroleum left in the subterranean formation. These supplemental operations are normally referred to as secondary recovery operations. If this supplemental recovery operation is the second in a series of such operations, it will be referred to as a tertiary recovery operation. However, the terminology is unimportant for the purposes of this application and relates only to the sequence in which they are carried out.

The most widely used supplemental recovery technique because of its ease of implementation and low capital outlay is water flooding through injection wells drilled into the subterranean formation. In a water flooding operation, the injected fluid displaces oil through the formation to be produced from the production well. A major disadvantage to water flooding, however, is its relatively poor displacement efficiency largely due to the fact that water and oil are immiscible at reservoir conditions and high interfacial tension exists between the flood water and the oil. For this reason, after a water flood, a large portion of the oil is still left unrecovered in the reservoir.

It has been recognized by those skilled in the art that a solution affecting a reduction in this interfacial tension between water and oil would provide a much more efficient recovery mechanism. Therefore, the inclusion of a surface active agent or surfactant in the flood water was recognized as an acceptable technique for promoting displacement efficiency of the reservoir oil by the water. For example, U.S. Pat. No. 3,468,377 discloses the use of petroleum sulfonates in water flooding operations and U.S. Pat. No. 3,553,130 discloses the use of ethylene oxide adducts of alkyl phenols for the same purpose. The use in water flooding operations of water soluble surface active alkaline earth resistant polyglycol ethers is disclosed in U.S. Pat. No. 2,333,381. Other specialized surfactants, as will be discussed later, have been discovered to have special properties useful in water flooding operations such as a tolerance for high salinity and calcium, magnesium and/or ion concentrations often found in reservoir waters.

However, field operations employing surfactants and surface active agents in injected fluid have not always been entirely satisfactory due to the fact that these materials are often adsorbed by the formation rock to a relatively high degree, resulting in an ever declining concentration of the materials as they progress through the reservoir. Therefore, large concentrations of surface active materials have heretofore been necessary to maintain a sufficient concentration at the oil-water interface. Due to this, many proposed flooding operations involving surface active materials have been uneconomical.

Another serious problem for any recovery techniques involving the driving of oil with a fluid is premature breakthrough of the injection fluid. This premature breakthrough indicates that the reservoir has not been adequately swept of oil. The problem is often described in terms of sweep efficiency as distinguished from the displacement efficiency described above. Displacement efficiency involves a microscopic pore by pore efficiency by which water displaces oil, whereas sweep efficiency is related to the growth portion of the reservoir which is swept and unswept by the injected fluid. A major cause of poor sweep efficiency is associated with the fact that the injected fluid generally has a lower viscosity than the displaced fluid or petroleum. Thus, the injected fluid has a higher mobility and tends to finger through the oil thus prematurely breaking through to the production well.

The solution to this high mobility problem is to increase the viscosity of the driving fluid. One way to do this is to add polymeric organic materials to a driving water which has the effect of increasing the viscosity of the water, thereby increasing the sweep efficiency of the supplemental recovery process. U.S. Pat. No. 3,039,529 and U.S. Pat. No. 3,282,337 teach the use of aqueous polyacrylamide solutions to increase the viscosity of the injected fluid thereby promoting increased sweep efficiency. Polysaccharides as taught in U.S. Pat. No. 3,581,824 have been used for the same purpose. These polymers are quite expensive and any polymer lost to adsorption on the reservoir matrix adds substantially to the cost since additional polymer is required to maintain a given viscosity.

The above described problems have been recognized by those skilled in the art of oil recovery and certain sacrifical compounds have been added to pretreat the formation in order to decrease the adsorption of subsequently injected surfactants and/or polymers. For example, U.S. Pat. No. 3,414,054 discloses the use of aqueous solutions of pyridine; U.S. Pat. No. 3,469,630 discloses the use of sodium carbonate and inorganic polyphosphates, and U.S. Pat. No. 3,437,141 discloses the use of soluble carbonates, inorganice polyphosphates and sodium borate in combination with a saline solution of a surfactant having both a high and a low molecular weight component. These materials have not been completely satisfactory from a standpoint of performance and economics, however.

SUMMARY OF THE INVENTION

The invention is a process of producing petroleum from subterranean formations having an injection well and a production well in communication therewith. The process comprises injecting into the formation via the injection well an aqueous solution of alkoxylated asphalts and then injecting via the injection well into the formation a chemical oil recovery agent, for example, surfactant and/or polymer. It is the usual practice to then inject a fluid such as water to sweep the chemical components through the reservoir to the production well, thereby displacing oil from the subterranean formation to the surface of the earth.

DESCRIPTION OF THE PREFERRED EMBODIMENTS

A sacrificial material is injected by the process of this invention through an injection means comprising one or more injection wells into a subterranean petroleum-containing formation to preferably occupy or cover all potential adsorption sites of the rock within the subterranean formation thereby reducing the extend of adsorption of the more expensive chemical oil recovery agent injected therebehind. A sacrificial agent performs best when it exhibits high adsorption on active sites of rock surfaces, and thus diminishes surfactant and/or polymer adsorption. Chemical compounds of polyelectrolytic nature have the proper physico chemical and structural requirements to behave as successful sacrificial agents. The functional group on the sacrificial agent molecules enhances adsorption either by hydrogen bonding or electrostatic attraction to active sites on the rock surfaces.

A satisfactory sacrificial material has at least three important characteristics. First, it should be less expensive than the surfactant since it cannot be recovered. Next, it must be adsorbed readily by the subterranean formation matrix. Preferably the sacrificial material should be adsorbed more readily than the chemical oil recovery agent to be used in the process. This will enable the sacrificial agent to be used not only as a preflush but in admixture with the chemical recovery material. The third important characteristic of a sacrificial agent is that the presence of such adsorbed sacrificial material must retard or eliminate the subsequent adsorption of the surfactant and/or polymer chemical recovery material on the adsorption site of the formation rock. By adsorption sites of the formation rock is meant those parts of the surfaces of the pores of the formation rock capable of adsorbing a chemical compound from a solution on contact.

The sacrificial material does not always have an appreciable effect on the recovery efficiency of the chemical flooding operation. Additional oil is generally recovered only if the sacrificial material is followed by or is admixed with a surfactant and/or a polymer chemical recovery agent which will effectively increase the amount of oil displaced from the subterranean formation. This is not always true as in this invention where the sacrificial agent has surface active properties. When a surfactant is chosen as the chemical recovery agent it should be injected after the sacrificial agent or in admixture therewith and ahead of the following flooding water thereby achieving the desired interfacial tension reduction between the injected fluid and the displaced fluid without loss of surfactant on the formation matrix. The surfactant may be present in a hydrocarbon solvent or in an aqueous solution or in a combination thereof. Any type of surfactant known in the art may be used in the practice of this invention. Some types of surfactants were mentioned previously. In addition, surfactants disclosed and claimed in the following U.S. patents are particularly useful since they have been found to be capable of performing in reservoirs having both high salinities and high hardness levels: U.S. Pat. No. 3,858,656; 3,811,505; 3,811,504; and 3,811,507.

Likewise, the amount of surfactant which must be employed in the practice of any chemical flood is generally known in the art and is to be found in published literature. However, the concentration of surfactant generally will range from 0.01 to 0.1 pore volumes of an aqueous surfactant solution having dissolved therein from 0.001 to 0.5 percent by weight of the surfactant itself. As mentioned before, in addition to a preflush or a substitution thereof, a small amount of the sacrificial material may also be added to the surfactant solution to prevent the adsorption of the surfactant on the formation matrix.

In carrying out this invention, a sacrificial material comprising alkoxylated asphalts is injected via the suitable injection means, i.e. through one or more injection wells completed in the subterranean hydrocarbon formation, so that the sacrificial material enters the formation ahead of the surfactant. The surfactant is then injected into the subterranean hydrocarbon-containing formation followed by the injection water to drive it to the production well. By injecting the sacrificial material in this particular sequence, the sacrificial material adsorbs on and occupies the sites existing in the matrix of the formation thereby eliminating or substantially decreasing the tendency for the subsequently injected surfactant and/or polymer to adsorb on the rock matrix.

The sacrificial agents useful in the process of my invention are alkoxylated asphalts.

Many types of asphalts are useful in the process of this invention. The American Society for Testing and Materials defines asphalts are "A dark brown to black cementitious materials solid of semi-solid in consistency, in which the predominating constituents are bitumens which occur in nature as such or are obtained as residua in refining petroleum." Thus, asphalts occur naturally or may be obtained as residues in petroleum refining. The Kirk-Othmer Encyclopedia of Chemical Technology, Volume 2 at pages 762 to 789 discussed the general characteristics of various types of asphalts.

Petroleum derived asphalts may be further divided into straight reduced asphalts which are obtained in reduced pressure stills or precipitated with propane or butane. Also, asphalts may be obtained from the residues of cracking operations. Petroleum derived asphalts may also be of air blow variety.

Naturally occurring asphalts include gilsonite graphamite, glance pitch, Burmudez, rock asphalts and Trinidad.

Many other examples of both petroleum derived and natural asphalts could be given but the above description will apprise those skilled in the art of asphalts stocks acceptable for use in this invention.

Since the asphalt is to be alkoxylated, it must contain active hydrogens. Determination of the active hydrogen content of any particular stock is easily determined by known analytical techniques.

The preferred alkylene oxide for reacting with the asphalts in our invention are ethylene oxide and propylene oxide or mixtures thereof so that the resulting alkoxylated asphalt is water soluble. Most preferably, ethylene oxide or a major amount of ethylene oxide and a minor amount of propylene oxide shoud be used. The ratio of alkylene oxide to asphalt should be such that the resulting product is water soluble. A suggested range of ethoxylation is from about 20 to about 800 moles of ethylene oxide per mole of asphalt. This range is given only as a guide. One skilled in the art will recognize that the proper amount of alkoxylation will depend on many variables including the type of asphalt, the type of formation, water salinity and the type of surfactant in the flood.

The quantity of sacrificial ethoxylated asphalts to be injected into the subterranean hydrocarbon formation may be any amount up to and including an amount sufficient to occupy substantially all of the active sites of the formation matrix. If less than the maximum amount is used, there will be a corresponding reduction in the adsorption of surfactant from injection solution onto the formation matrix although the amount of reduction will not be as great as in the case where the formation is completely saturated with sacrificial ethoxylated asphalts. At a maximum only the amount of ethoxylated asphalts needed to completely occupy the active sites on the formation is needed. Although the only detriment resulting from using excess sacrificial material would be an increase in the cost of operating the oil recovery program.

The amount of sacrificial ethoxylated asphalts needed in the process of the invention depends on the particular formation, the area or pattern to be swept and other formation characteristics. It is convenient to express the quantity of sacrificial agents needed in terms of pounds of material per acre foot of formation for the particular pattern which the injection fluid is expected to sweep. Ordinarily from about 15 to about 150 pounds per acre foot of formation of the sacrificial ethoxylated asphalts described in the specification would be sufficient to prevent substantial adsorption of surfactant from injected surfactant solution.

The effectiveness of this invention for reducing the adsorption of surfactant or polymer on formation rock and chemical flooding operations is demonstrated by the following examples which are presented by way if illustration and are not intended as limiting the spirit and scope of the invention as defined in the claims.

PREPARATION OF AN ETHOXYLATED ASPHALT

The following procedure describes the ethoxylation of an asphalt. The asphalt was originally obtained by deasphalting during the manufacture of lubricating oil in a vacuum reducing still. The asphalt has a melting point of 215°–300°F. and was air blown at 500°F. resulting in a hydroxyl number of 30. A 2 liter Parr reactor was charged with 50 gms (0.02 moles) of crushed asphalt, 1.4 gms potassium hydroxide flakes, and 500 ml of toluene. The reactor was sealed and purged several times with nitrogen. A cylinder containing the prescribed quantity of ethylene oxide was attached to the reactor in such a way as to allow the ethylene oxide to be discharged at the bottom of the reactor. The reactor temperature was then raised to approximately 160°C. Upon reaching 160°C. the ethylene oxide was added in several additions. After all the ethylene oxide had been added (15 moles) the reaction mixture was kept at 160°C. for 1 hour. The Parr reactor was then cooled and purged with nitrogen. The toluene was evaporated leaving the ethoxylated asphalt product. This product was used in the data shown in Tables I and II.

EXPERIMENTAL

Adsorption and capillary displacement tests were performed on the mixtures in Table I below.

The adsorption test was performed to determine the tendency for dodecyl benzene sulfonate surfactant to adsorb on a calcium carbonate substrate. The test was performed by placing a weighed amount of calcium carbonate powder into containers along with various surfactant solutions as shown in Table I. The containers were then agitated uniformly and the amount of adsorption of dodecyl benzene sulfonate was measured as follows.

An aliquot of the mixtures was titrated against a 5 × $10^{-4}$ molar solution of $CH_3(CH_2)_{15}N(CH_3)_3Cl$ to determine the dodecyl benzene sulfonate concentrations in the test samples. Table II shows the dodecyl benzene sulfonate concentrations in these mixtures after the tests along with capillary displacement data.

Capillary displacement tests are a convenient and accurate method for measuring the ability of an aqueous solution of surfactant to displace a fluid such as crude oil.

The tests are performed by filling a number of closed end capillary tubes with the particular crude oil being studied, and submerging the capillary tubes horizontally into the desired aqueous phase.

In each instance of displacement of oil by the aqueous phase, a meniscus is formed at the oil-water interface. The only force tending to displace oil from the capillary tube was the force resulting from the difference in specific gravities of the two fluids. This force was offset by the interfacial tension between the oil and formation water.

When the surfactant composition was successful in producing a movement in the meniscus, the distance traveled by the meniscus in millimeters in a 5 minute exposure interval in the chemical system is recorded.

Adsorption and capillary displacement tests were performed on the mixtures in Table I.

TABLE I

| Test No. | | Dodecyl Benzene Sulfonate | 9.5 Mole Ethylene Oxide Adduct of Nonyl Phenol | Ethoxylated Asphalt | Substrate |
|---|---|---|---|---|---|
| I | 1) | 0.4% | 0.6% | -0- | None |
| | 2) | -0- | -0- | 0.2% | None |
| | 3) | 0.4% | 0.6% | -0- | 20g $CaCO_3$ |
| | 4) | 0.4% | 0.6% | 0.2% | None |
| | 5) | 0.4% | 0.6% | 0.2% | 20g $CaCO_3$ |
| | 6) | 0.4% | 0.6% | 0.2% | 20g $CaCO_3$ |
| II | 1) | 0.4% | 0.6% | 0.5% | None |
| | 2) | 0.4% | 0.6% | 0.5% | 20g $CaCO_3$ |
| | 3) | 0.4% | 0.6% | 0.5% | 20g $CaCO_3$* |
| III | 1) | 0.4% | 0.6% | 1.0% | None |
| | 2) | 0.4% | 0.6% | 1.0% | 20g $CaCO_3$ |

TABLE I-continued

| Test No. | Dodecyl Benzene Sulfonate | 9.5 Mole Ethylene Oxide Adduct of Nonyl Phenol | Ethoxylated Asphalt | Substrate |
|---|---|---|---|---|
| 3) | 0.4% | 0.6% | 1.0% | 20g CaCO$_3$ |

*Indicates pretreatment of CaCO$_3$ with the asphalt solution and subsequent addition of dodecyl benzene sulfonate and the 9.5 mole ethylene oxide adduct of nonyl phenol. All the tests were performed at constant salinity and 190°F.

TABLE II

| Test No. | | Sulfonate Content | Sulfonate Loss | Sulfonate Loss g of CaCO$_3$ | Capillary Displacement 300 sec. | 600 sec. |
|---|---|---|---|---|---|---|
| I | 1) | 0.2125g | | | 7.9 mm | 12.0 mm |
|   | 2) | 0.00g | | | 0.0 | 0.0 |
|   | 3) | 0.1254g | 0.0871g | 0.0044g | 0.0 | 0.2 mm |
|   | 4) | 0.2125g | | | 7.0 mm | 9.0 mm |
|   | 5) | 0.2019g | 0.0106g | 0.0005g | 6.6 mm | 9.6 mm |
|   | 6) | 0.1976g | 0.0149g | 0.0007g | 7.2 mm | 10.2 mm |
| II | 1) | 0.2125g | | | 8.1 mm | 10.5 mm |
|   | 2) | 0.2008g | 0.0117g | 0.0006g | 6.0 mm | 7.5 mm |
|   | 3) | 0.1998g | 0.0127g | 0.0006g | 9.0 mm | 13.2 mm |
| III | 1) | 0.2125g | | | 7.5 mm | 9.0 mm |
|   | 2) | 0.1966g | 0.0159g | 0.0008g | 8.3 mm | 11.2 mm |
|   | 3) | 0.1976g | 0.0149g | 0.0007g | 8.5 mm | 11.8 mm |

Conclusions

1. Adsorption loss in dodecyl benzene sulfonate concentration in the above experiment in absence of ethoxylated asphalt was approximately 41% of initial concentration or 4.4 mg.

2. After addition of concentration ranging from 0.2% – 1.0% ethoxylated asphalt, the adsorption loss was reduced to 5 – 8% or 0.5 to 0.8 mg/g.

3. Capillary displacement tests indicated no interference from the ethoxylated asphalt in the activity of the surfactant system.

We claim:

1. A method for recovering oil from a subterranean formation containing oil and having an injection well and a production well comprising:
   a. injecting through an injection well into the formation an aqueous solution of alkoxylated asphalts,
   b. subsequently injecting into the formation via the injection well a surfactant solution,
   c. subsequently injecting into the formation via the injection well flooding water, and
   d. producing oil from the formation via the production well.

2. A method as in claim 1 wherein the alkoxylated asphalt contains from about 20 moles of ethylene oxide to 750 moles of ethylene oxide per mole of asphalt.

3. A method as in claim 1 wherein the alkoxylated asphalt is present in amounts ranging from about 15 to about 150 pounds per acre foot of the formation.

4. A method as in claim 1 wherein the asphalt is alkoxylated with a mixture of ethylene oxide and propylene oxide.

5. A method as in claim 1 wherein the asphalt is alkoxylated with ethylene oxide.

6. In a method for recovering oil from a subterranean formation containing oil and having an injection well and a production well wherein a surfactant solution is injected into the injection well in order to drive the oil to the production well where it is produced the improvement which comprises:
   injecting into the injection well prior to the surfactant an aqueous solution of ethoxylated asphalts.

7. A method for recovering oil from a subterranean formation containing oil and having an injection well and a production well comprising:
   a. injecting through an injection well into the formation an aqueous solution of ethoxylated asphalts having from about 20 moles to about 750 moles of ethylene oxide per mole of asphalt,
   b. subsequently injecting into the formation via the injection well a surfactant solution,
   c. subsequently injecting into the formation flooding water via the injection well, and
   d. producing oil from the formation via the production well.

8. A method as in claim 7 wherein the surfactant comprises an anionic surfactant.

9. A method as in claim 8 wherein the surfactant comprises a mixture of an anionic and nonionic surfactant.

* * * * *